E. W. FRITZ.
SHOCKER ATTACHMENT FOR HARVESTERS.
APPLICATION FILED AUG. 11, 1908.
917,282.
Patented Apr. 6, 1909.
2 SHEETS—SHEET 1.
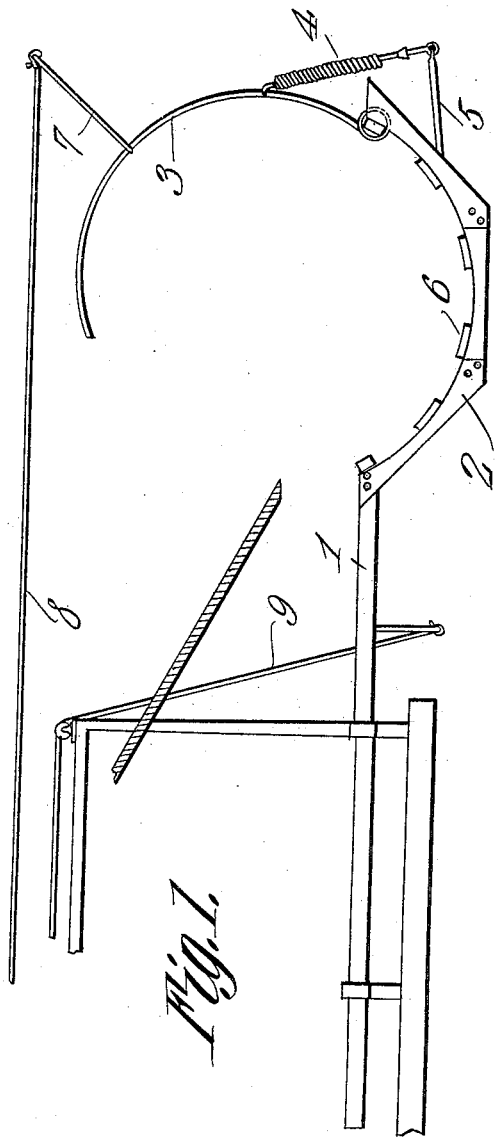
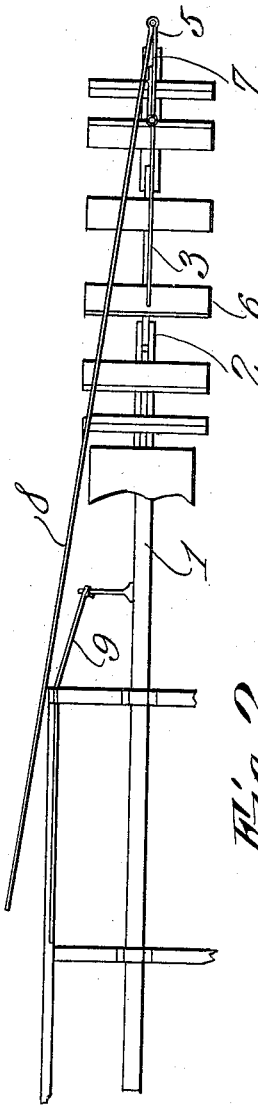
Emanuel W. Fritz, Inventor
Witnesses
By C. A. Snow & Co.
Attorneys

E. W. FRITZ.
SHOCKER ATTACHMENT FOR HARVESTERS.
APPLICATION FILED AUG. 11, 1908.

917,282.

Patented Apr. 6, 1909.
2 SHEETS—SHEET 2.

Witnesses

Inventor
Emanuel W. Fritz.
By C. A. Snow & Co.
Attorneys

UNITED STATES PATENT OFFICE.

EMANUEL W. FRITZ, OF DENTON, TEXAS.

SHOCKER ATTACHMENT FOR HARVESTERS.

No. 917,282.　　　　Specification of Letters Patent.　　　Patented April 6, 1909.

Application filed August 11, 1908. Serial No. 448,034.

*To all whom it may concern:*

Be it known that I, EMANUEL W. FRITZ, a citizen of the United States, residing at Denton, in the county of Denton and State of Texas, have invented a new and useful Shocker Attachment for Harvesters, of which the following is a specification.

This invention has relation to shocker attachment for harvesters, and it consists in the novel construction and arrangement of its parts, as hereinafter shown and described.

The object of the invention is to provide an attachment of the character indicated which is of simple construction and of light weight, and which may be easily and readily manipulated whereby the same may accumulate bundles as they are delivered from the harvester, and, at certain intervals, the said attachment may be operated whereby the said bundles are deposited in the form of a shock upon the ground.

With this object in view, the attachment consists, primarily, of an arm which is mounted upon the frame of the harvester and which is adapted to have partial rotation in the direction in which the harvesting machine is moving, for the purpose of delivering the shock, and in the opposite direction when it is assuming its normal position for the reception of bundles from the harvester. Parallel slats are mounted upon the said arm and form a cradle for the reception of the bundles, a gripping arm is pivotally mounted upon the said rotary arm and a spring is attached at its opposite ends with the said arms and is under tension with a tendency to hold the gripping arm away from the rotary arm. A cable is connected at one end with the said gripping arm and at its other end is in the vicinity of the operator's seat upon the harvester, whereby the said cable may be easily reached and when drawn toward the said gripping arm be swung down toward the rotary arm. A cable is connected at one end with the rotary arm and passes around the frame of the harvester and lies at its other end in the vicinity of the operator's seat, who may operate the last said cable whereby the said rotary arm is turned as above indicated.

Figure 3:
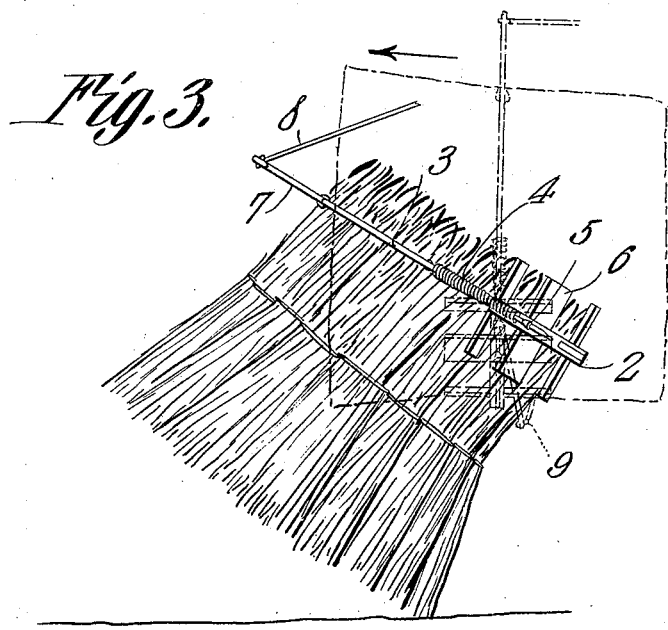
Figure 4:
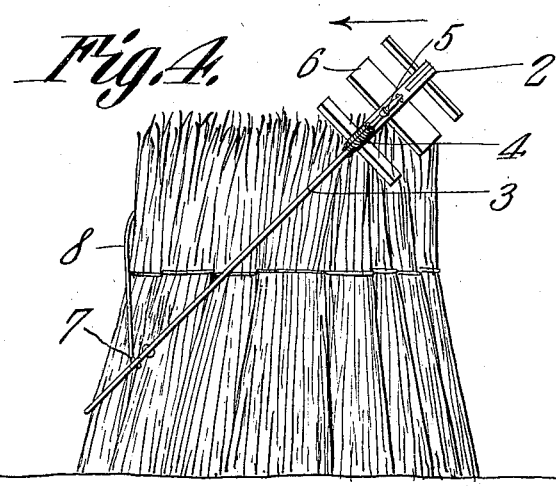

Figure 1 is a side elevation of the shocker. Fig. 2 is a top plan view of the same. Fig. 3 is an end view, showing the same in the act of depositing a shock. Fig. 4 is an end view of the shocker, showing the positions of the parts after the shock is deposited.

The attachment consists of the arm 1 which is rotatably mounted upon the frame of the harvester and is provided at its outer portion with the concaved section 2. The curved gripper arm 3 is pivotally attached at one end to the outer extremity of the arm 1 and the spring 4 is connected at one end with the said gripper arm 3 and at its opposite end with a bracket 5 carried by the outer end portion of the arm 1. The spring 4 is under tension with a tendency to hold the inner or free end of the gripper arm 3 away from the intermediate portion of the arm 1. The parallel slats 6 are mounted upon the upper side of the concaved portion or section 2 of the arm 1 and forms a cradle for the reception of bundles of grain from the harvesting machine. The standard 7 is arranged upon the intermediate portion of the gripper arm 3 and a cable 8 is connected at one end with the upper end of the said standard and at its opposite end is located normally in the vicinity of the portion of the harvester that is occupied by the operator. The cable 9 is attached at one end to the arm 1 and passes around the frame of the harvesting machine, and lies at its opposite end in the vicinity of the space occupied by the operator.

The operation of the shock-forming attachment is as follows:—As the bundles of grain are tied upon the grain deck of the harvesting machine and are delivered from the edge thereof they fall upon the slats 6 of the attachment and the operator, by drawing upon the cable 8, holds the gripper arm 3 down upon the upper side of the said bundles. As each successive bundle is added to the pile already collected upon the said slats the operator permits the cable 8 to become slack so that the gripper arm 3 under the impulse of the spring 4 may swing away from the bundles already deposited upon the slats, whereby the oncoming bundle may be deposited thereon also. After the deposit of each bundle the operator again draws the cable 8 taut so that the gripper arm is held down upon the bundle the major portion of the time, and is only permitted to swing away in order to enable a successive bundle to be added to the pile. When sufficient bundles have been collected the cable 9 is drawn by the operator which partially rotates the arm 1, and thus the butt-ends of the bundles are brought into contact with the ground and they are set up in shock form. The operator then gives the cable 9 a further pull which causes the slats 6 and the concaved section 2 of the arm 1 to swing up over the standing shock, and at the same time the cable 8 is permitted to pay out whereby the gripper arm 3 will swing away from the shock just deposited upon the ground. Thus, as the harvesting machine advances, the shocking attachment passes over the top of the shock, and, when beyond the same, the operator releases the strain upon the cable 9 when the parts of the shocking attachment will assume their normal positions as above indicated.

Thus it will be seen that a simple and an effective means for collecting the bundles into a shock and for setting the same up upon the ground is provided as an attachment for a harvesting machine, and that in the operation of the same but minimum care and attention will be required on the part of an operator, thus saving the expense of hands following the machine for the purpose of setting the bundles up into shocks.

Having described my invention, what I claim as new, and desire to secure by Letters Patent, is:—

1. A shocker for harvesting machines comprising an arm mounted for rotation and having a concaved outer portion, parallel slats mounted upon the concaved portion of the arm, means for partially rotating the arm, a gripper arm pivotally connected with the first said arm, a spring connecting the gripper arm with the rotary arm and being under tension with a tendency to hold the free end of the gripper arm away from the rotary arm and means for swinging the free end of the gripper arm toward the rotary arm.

2. A shocker attachment for grain harvesters comprising an arm mounted for rotation and having a concaved outer portion, parallel slats mounted on the concaved portion of said arm, a cable connected with the said arm and adapted to be used to rotate the same, a gripper arm pivotally connected with the first said arm, a spring connected at its ends with the said arms being under tension with a tendency to swing the gripper arm away from the first said arm, a standard mounted on the gripper arm, a cable connected at one end with the said standard and adapted to draw the gripper arm toward the rotary arm.

In testimony that I claim the foregoing as my own, I have hereto affixed my signature in the presence of two witnesses.

EMANUEL W. FRITZ.

Witnesses:
S. H. HOSKINS,
W. N. MASTERS.